United States Patent Office 3,005,032
Patented Oct. 17, 1961

3,005,032
SOLVENT EXTRACTION OF NAPHTHALENIC FROM NON-NAPHTHALENIC AROMATIC HYDROCARBONS USING DIMETHYL SULFOXIDE
Earle C. Makin, Jr., El Dorado, Ark., assignor to Monsanto Chemical Company, St. Louis, Mo., a corporation of Delaware
No Drawing. Filed Aug. 19, 1957, Ser. No. 679,062
4 Claims. (Cl. 260—674)

This invention relates to a method of treatment of a complex mixture of aromatic hydrocarbons.

It is an object of this invention to separate dissimilar aromatic hydrocarbons contained in mixtures thereof.

It is a further object of this invention to separate dissimilar classes of aromatic hydrocarbons of varying degrees of aromaticity contained in mixtures thereof.

Another object of this invention is to provide a means of separating naphthalenic hydrocarbons from mixtures thereof with aromatic hydrocarbons other than naphthalenic hydrocarbons.

A specific object of this invention is to provide means of separating aromatic hydrocarbons from petroleum streams consisting essentially of a mixture of dissimilar aromatic hydrocarbons.

Further objects will become apparent from the description of the invention.

According to this invention selective separation of dissimilar aromatic hydrocarbons from mixtures thereof is accomplished by solvent extraction of the mixture using as the solvent dimethyl sulfoxide containing a minor amount of water. The following examples illustrate this invention:

EXAMPLE I

A mixture of 50 parts by volume of α-methyl naphthalene and 50 parts by volume of triethyl benzene (mixture of isomers) was agitated for approximately 5 minutes at a temperature of approximately 25° C. with 100 parts by volume of dimethyl sulfoxide and 5 parts by volume of water and then allowed to stand to separate into two phases. A separation occurred in approximately 1 minute. An extract phase of approximately 133 parts by volume and a raffinate phase of approximately 71 parts by volume were recovered. The extract phase contained 24.8 volume percent of hydrocarbon of which 76.4 volume percent was α-methyl naphthalene representing 50 volume percent of the total α-methyl naphthalene in the feed. Thus, in only a single stage extraction, a significant separation of α-methyl naphthalene from triethyl benzene in a mixture thereof was effected.

EXAMPLE II

The procedure set forth in Example I was repeated using a hydrocarbon mixture containing 50 parts by volume of α-methyl naphthalene and 50 parts by volume of diethyl benzene (mixture of isomers) and using 100 parts by volume of dimethyl sulfoxide and 5 parts by volume of water as the solvent. The extract phase contained 35.8 volume percent of hydrocarbon of which 53.4 volume percent was α-methyl naphthalene representing 33.4% of the α-methyl naphthalene in the feed.

EXAMPLE III

The procedure set forth in Example I was repeated using a hydrocarbon mixture containing 50 parts by volume of α-methyl naphthalene and 50 parts by volume of sec. amyl benzene and using 100 parts by volume of dimethyl sulfoxide and 4 parts by volume of water as the solvent. The extract phase contained 39.7 volume percent of hydrocarbon of which 56.3 volume percent was α-methyl naphthalene representing 41.1 volume percent of α-methyl naphthalene in the original mixture.

EXAMPLE IV

The procedure set forth in Example I was repeated using a hydrocarbon mixture of 50 parts by volume of α-methyl naphthalene and 50 parts by volume of tetralin and using 100 parts by volume of dimethyl sulfoxide and 6 parts by volume of water as the solvent. The extract phase contained 35.5 volume percent of hydrocarbon of which 51.9 volume percent was α-methyl naphthalene representing 28.2 volume percent of α-methyl naphthalene present in the original mixture.

EXAMPLE V

The procedure set forth in Example I was repeated using a hydrocarbon mixture of 50 parts by volume of α-methyl naphthalene and 50 parts by volume of di-isopropyl biphenyl (mixture of isomers) and using 100 parts by volume of dimethyl sulfoxide and 3.75 parts by volume of water as the solvent. The extract phase contained 37.5 volume percent of hydrocarbon of which 54.0 volume percent was α-methyl naphthalene representing 68.0 volume percent of the α-methyl naphthalene present in the original mixture.

EXAMPLE VI

In this example the hydrocarbon mixture treated in accordance with the novel process of this invention was the furfural extract a light cycle oil recovered from the cracked products of a Thermofor catalytic cracking unit, employing a paraffin base crude oil distillate as the feed to the cracker. The furfural extract of this light cycle oil contained 51.8 mol percent of naphthalenes with the balance consisting essentially of alkyl benzenes, indenes, and non-condensed dicyclics. Eighty parts by volume of the hydrocarbon mixture and 40 parts by volume of dimethyl sulfoxide containing 0.5 part by volume of water were thoroughly agitated for 2 minutes at approximately 29° C. and then allowed to stand and to phase for approximately 5 minutes. The extract phase contained 23 volume percent of hydrocarbon of which 85 volume percent were naphthalenes.

EXAMPLE VII

The effect of water concentration in the solvent in the novel extraction process of this invention is illustrated by this example wherein a hydrocarbon mixture containing 50 parts by volume of α-methyl naphthalene and 50 parts by volume of triethyl benzene was extracted in accordance with the procedure set forth in Example I using 100 parts by volume of dimethyl sulfoxide containing varying quantities of water. The analysis of the extract phase obtained in these various runs is set forth in the following table:

*Effect of water on efficiency of dimethyl sulfoxide selectivity—Analysis of extract phase*

| Vol. Percent Water in Dimethyl Sulfoxide | 2 | 5 | 6 | 10 |
|---|---|---|---|---|
| Parts by Volume | 165 | 133.5 | 129 | 123 |
| Vol. percent hydrocarbon | 43.2 | 24.8 | 23.6 | 16 |
| Vol. percent α-methyl naphthalene in hydrocarbon phase | 57.7 | 76.4 | 72.5 | 88.0 |
| Vol. percent of available α-methyl naphthalene | 81.6 | 50.4 | 44.2 | 34.8 |

The procedures set forth in the preceding examples can be varied substantially without departing from the scope of this invention. The amount of solvent to be employed in any case will be dependent upon the particular hydrocarbon mixture or petroleum fraction being treated as well as upon the type of extraction equipment in which the extraction process is carried out. The nature of the process, that is, whether it be batch, multiple batch, batch countercurrent or continuous countercurrent extraction, as well as the number of extraction stages employed and the general efficiency of the process, will to a degree effect the preferred amount of solvent to be employed. While any ratio of solvent to hydrocarbon which is great enough to produce the sought for separation may be employed, volume ratios of from about 0.5:1 to 20:1, respectively, are applicable.

The temperature of the liquid phase reaction process of this invention can be varied substantially. Temperatures ranging from about 10° C. to about 150° C. can be employed with temperatures in the range from about 20° C. ot about 80° C. being preferred. The boiling point of the solvent and the boiling point of the hydrocarbon mixture extracted will influence the choice of the extraction temperature. The extraction can be carried out under reduced pressure, at atmospheric pressure or at superatmospheric pressures thereby affording a wide temperature range under which this process can be carried out in the liquid phase.

The solvent used in the novel process of this invention consists essentially of dimethyl sulfoxide containing a minor amount of water. The amount of water can be varied substantially. The minor amount of water is that amount required to produce phasing and permit the separation of extract phase and a raffinate phase. The exact amount of water which can be used or tolerated in the solvent will necessarily vary with the nature of the hydrocarbon mixture extracted. Generally, dimethyl sulfoxide containing from about 0.5 to about 40 volume percent of water is applicable with dimethyl sulfoxide containing from about 0.5 to about 10 volume percent water being preferred.

The novel extraction process of this invention is used to separate particular types of aromatic hydrocarbons contained in mixtures of aromatic hydrocarbons of varying degrees of aromaticity. Insofar as this invention is concerned the degree of aromaticity of an aromatic hydrocarbon is determined solely by the type, regardless of substituent groups, of aromatic nuclei in the molecule. Thus, benzene, naphthalene, biphenyl and anthracene have different degrees of aromaticity for the purposes of this invention, while sec. amyl benzene, diethyl benzene and triethyl benzene have the same degree of aromaticity for the purposes of this invention. The process of this invention is well suited for the separation of naphthalenic hydrocarbons from mixtures of hydrocarbons other than naphthalenic hydrocarbons. The process of this invention is particularly suited for the removal of naphthalenic hydrocarbons from essentially aromatic petroleum streams containing naphthalenic hydrocarbons together with aromatic hydrocarbons of a degree of aromaticity different from naphthalenic hydrocarbons.

The liquid phase solvent extraction process of this invention is carried out in any convenient manner well-known to those skilled in the art. In general, the hydrocarbon or fraction is mixed or contacted with the solvent, agitated to effect maximum separation, and the resulting mixture allowed to separate into two phases. The phases are separated mechanically such as by decantation. The raffinate phase contains a relatively small amount of the solvent and this solvent can be recovered by any convenient method such as by a distillation process. The extract phase, comprising the major part of the solvent together with the extracted aromatic hydrocarbons is then processed to recover the hydrocarbon and solvent. Any convenient and well-known process may be used for this purpose. Distillation processes are particularly applicable or the extract phase may be solvent extracted with another solvent to recover the hydrocarbons contained therein.

What is claimed is:

1. A liquid phase process for separating naphthalenic hydrocarbons from a mixture thereof with non-naphthalenic aromatic hydrocarbons which consists essentially of contacting said hydrocarbon mixture at a temperature ranging from 10° C. to 150° C. with a solvent composed of dimethyl sulfoxide containing an amount of water ranging from 0.5 to 40 volume percent which is sufficient to permit the separation of an extract phase and a raffinate phase, said solvent being employed in a solvent to hydrocarbon mixture volume ratio of from about 0.5:1 to about 20:1, separating an extract phase and a raffinate phase and recovering naphthalenic hydrocarbons from the extract phase.

2. The process as described in claim 1 wherein the dimethyl sulfoxide contains from about 0.5 to about 10 volume percent of water.

3. A liquid phase process for the separation of naphthalenic hydrocarbons from a petroleum stream consisting essentially of a mixture of naphthalenic hydrocarbons and other non-naphthalenic aromatic hydrocarbons which consists essentially of contacting said hydrocarbon mixture at a temperature ranging from about 10° C. to 150° C. with a solvent composed of dimethyl sulfoxide containing an amount of water ranging from 0.5 to 40 volume percent which is sufficient to permit the separation of an extract phase and a raffinate phase, said solvent being employed in a solvent to hydrocarbon mixture volume ratio of from about 0.5:1 to about 20:1, separating an extract phase and a raffinate phase and recovering naphthalenic hydrocarbons from the extract phase.

4. The process as described in claim 3 wherein the dimethyl sulfoxide contains from about 0.5 to about 10 volume percent of water.

References Cited in the file of this patent

UNITED STATES PATENTS

| | | |
|---|---|---|
| 2,304,289 | Tongberg | Dec. 8, 1942 |
| 2,319,813 | Grosse et al. | May 25, 1943 |
| 2,365,898 | Morris et al. | Dec. 26, 1944 |
| 2,615,057 | Wolff et al. | Oct. 21, 1952 |
| 2,773,918 | Stephens | Dec. 11, 1956 |
| 2,878,261 | Broughton | Mar. 17, 1959 |